K. VÖLLER & F. LÜHMANN.
GUN CARRIAGE.
APPLICATION FILED JUNE 30, 1914.
1,122,339.
Patented Dec. 29, 1914.
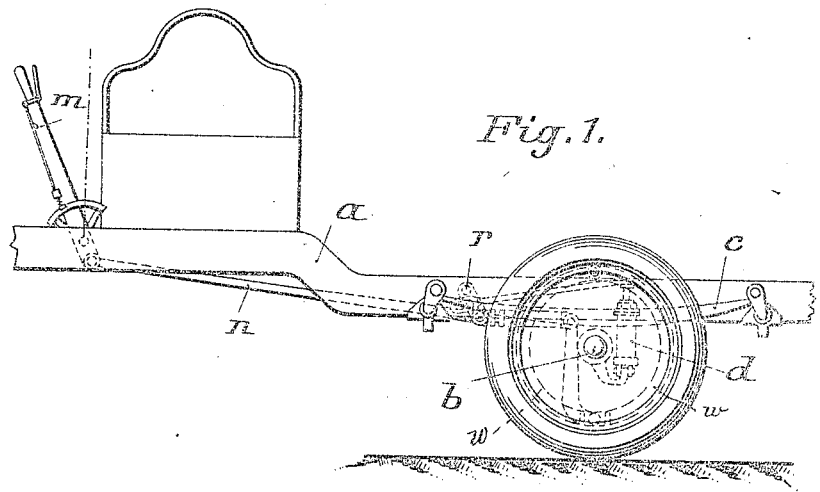
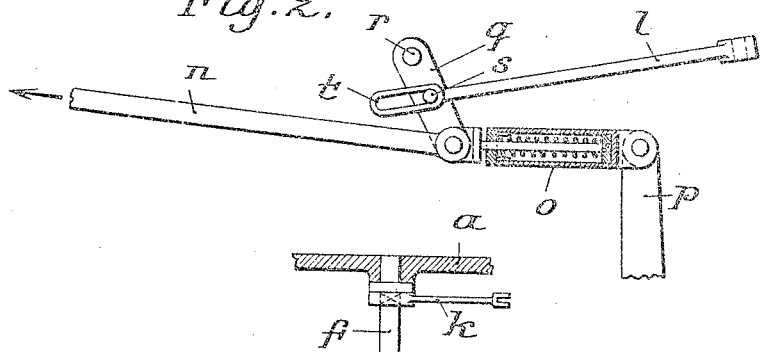
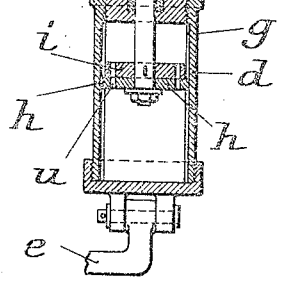
WITNESSES
INVENTORS

UNITED STATES PATENT OFFICE.

KARL VÖLLER AND FRIEDRICH LÜHMANN, OF DUSSELDORF, GERMANY.

GUN-CARRIAGE.

1,122,339.   Specification of Letters Patent.   Patented Dec. 29, 1914.

Application filed June 30, 1914. Serial No. 848,276.

*To all whom it may concern:*

Be it known that we, KARL VÖLLER, a subject of the German Emperor, residing at 12 Scharnhortstrasse, Dusseldorf, Germany, and FRIEDRICH LÜHMANN, a subject of the German Emperor, residing at 5 Sommerstrasse, Dusseldorf, Germany, have invented certain new and useful Improvements in Gun-Carriages; and we do hereby declare the following to be a full, clear, and exact description of the invention, such as will enable others skilled in the art to which it appertains to make and use the same.

The invention relates to means for securing the frame of a gun carriage to the wheel axle so as to set the springs out of action. Shock absorbers are usually inserted between the upper and lower frames of these carraiges to diminish the shock and to take the load off the springs, but before firing, the upper and lower parts are rigidly connected, so that the springs are not subjected to the voilent impulses due to firing.

It has been previously proposed to rigidly secure the upper and lower frames together by means of the shock absorbers, which for this purpose are constructed as hydraulic brakes, and in which the rigid connection is obtained by rotating the piston.

According to the present invention, this rotation is effected by the same members which bring the carriage brake into operation, and the arrangement is such that the rotation of the piston, which acts as the securing device, only takes place after the brake lever has been moved through a definite distance.

An example of a construction according to the invention is shown in the accompanying drawing.

Figure 1 is a view in side elevation. Fig. 2 is an enlarged view of the brake operating mechanism. Fig. 3 is a vertical section of the hydraulic buffer.

Referring to the drawings, $a$ is the upper frame of the carriage on which the gun is placed, and is supported in known manner relatively to the wheel axle $b$ by means of the springs $c$. $d$ is the cylinder of the hydraulic buffer which acts as a shock absorber and is secured by means of the arm $e$ to the wheel axle $b$, while the piston rod $f$ is pivoted in the frame $a$. The piston consists of two disks (Fig. 3) which are relatively rotatable, of which the disk $h$ is guided, so that it cannot rotate, by means of the groove $g$ of the cylinder, while the other disk $i$ is fastened to the piston rod and rotates with it. The rotation is effected by means of the lever $k$ with which the rod $l$ engages. This is connected with the members which operate the carriage brake.

The carriage brake $w$ is moved by the hand lever $m$ pivoted on the carriage frame and engages with the rod $n$ (Figs. 1 and 2). The latter is connected through the spring member $o$ with the brake lever $p$. The arm $q$ for actuating the securing device is linked to the rod $n$ and is pivoted to the frame of the carriage about the bolt $r$. On the arm $q$ there is a pin $s$ which engages in a slot $t$ of the rod $l$.

When the gun is to be fired, the carriage brake is first applied so that the wheels cannot move during firing. The hydraulic buffer only acts as a securing device when the pin $s$ arrives at the other end of the slot $t$, so that by the relative rotation of the two piston disks, the openings $u$ therein are moved out of alinement, preventing passage of fluid therebetween and locking the piston. The hydraulic buffer can also be set so as to act as a securing device independently of the members which serve for actuating the brake device.

We claim as our invention:

1. A gun carriage comprising a frame, carrying wheels and an axle therefor, springs connecting said frame and said axle, a brake-mechanism for said wheels, and means for rigidly securing said frame to said axle upon the actuation of said brake-mechanism.

2. A gun carriage comprising a frame, carrying wheels and an axle therefor, springs connecting said frame and said axle, a brake-mechanism for said wheels, means for rigidly securing said frame to said axle, and means for rendering the last-mentioned means effective upon a predetermined movement of said brake-mechanism.

3. A gun carriage comprising a frame, carrying wheels and an axle therefor, springs connecting said frame and said axle, a brake-mechanism for said wheels, means for rigidly securing said frame to said axle, and a sliding connection between said securing means and said brake-mechanism for rendering said securing means effective upon a predetermined movement of said brake-mechanism.

4. A gun carriage comprising a frame, carrying wheels and an axle therefor, springs connecting said frame and said axle, a brake-mechanism for said wheels, a shock-absorber between said frame and said axle, a connection between said shock-absorber and said brake-mechanism for rendering said shock-absorber ineffective as such upon a predetermined movement of said brake-mechanism.

5. A gun carriage comprising a frame, carrying wheels and an axle therefor, springs connecting said frame and said axle, a brake-mechanism for said wheels, a hydraulic buffer between said frame and said axle, a connection between said buffer and said brake mechanism for rendering said buffer ineffective as such upon a predetermined movement of said brake-mechanism.

6. A gun carriage comprising a frame, carrying wheels and an axle therefor, springs connecting said frame and said axle, a brake-mechanism for said wheels, a shock-absorber between said frame and said axle, said shock-absorber having rotatable means for preventing the normal movement of its parts, a connection between said shock-absorber and said brake-mechanism for rendering said shock-absorber rigid upon the actuation of said brake-mechanism.

7. A gun carriage comprising a frame, carrying wheels and an axle therefor, springs connecting said frame and said axle, a brake-mechanism for said wheels, a shock-absorber between said frame and said axle, said shock-absorber comprising two piston parts having coöperating ports, a cylinder wherein said piston parts are normally movable, a rotatable rod for moving one of said piston parts relatively to the other to place said ports out of alinement, and means connecting said rod to the brake-mechanism whereby the rod will be turned upon the actuation of said brake-mechanism.

In testimony whereof, we have signed this specification in the presence of two subscribing witnesses.

KARL VÖLLER.
FRIEDRICH LÜHMANN.

Witnesses to signature of Karl Völler:
  AUGUST FUGGER,
  ADA MARIA BERGER.
Witnesses to signature of Friedrich Lühmann:
  HELEN NUFER,
  FRANCES NUFER.